United States Patent
Maruhashi

(10) Patent No.: US 10,867,244 B2
(45) Date of Patent: Dec. 15, 2020

(54) METHOD AND APPARATUS FOR MACHINE LEARNING

(71) Applicant: FUJITSU LIMITED, Kawasaki (JP)

(72) Inventor: Koji Maruhashi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 707 days.

(21) Appl. No.: 15/720,056

(22) Filed: Sep. 29, 2017

(65) Prior Publication Data

US 2018/0096247 A1 Apr. 5, 2018

(30) Foreign Application Priority Data

Sep. 30, 2016 (JP) ................................ 2016-193675

(51) Int. Cl.
 G06N 3/08 (2006.01)
 G06N 20/00 (2019.01)
 G06K 9/66 (2006.01)
 G06F 21/55 (2013.01)
 H04L 29/06 (2006.01)

(52) U.S. Cl.
 CPC ............... *G06N 3/08* (2013.01); *G06K 9/66* (2013.01); *G06N 3/084* (2013.01); *G06N 20/00* (2019.01); *G06F 21/55* (2013.01); *G06K 2209/01* (2013.01); *H04L 63/1408* (2013.01)

(58) Field of Classification Search
 USPC ........................................................ 706/25
 See application file for complete search history.

(56) References Cited

U.S. PATENT DOCUMENTS

| 7,930,156 | B2 * | 4/2011 | Maruhashi | ............... G16B 5/00 |
| | | | | 703/11 |
| 7,991,700 | B2 * | 8/2011 | Yamakawa | ............ G06Q 50/18 |
| | | | | 705/76 |
| 8,732,117 | B2 * | 5/2014 | Maruhashi | .......... G06F 16/2465 |
| | | | | 707/602 |

(Continued)

FOREIGN PATENT DOCUMENTS

| JP | 8-329196 | 12/1996 |
| JP | 9-081535 | 3/1997 |
| JP | 9-138786 | 5/1997 |

OTHER PUBLICATIONS

Mathias Niepert et al., "Learning Convolutional Neural Networks for Graphs", Proceedings of the 33rd International Conference on Machine Learning, Jun. 2016 (10 pages).

*Primary Examiner* — Michael B Holmes
(74) *Attorney, Agent, or Firm* — Fujitsu Patent Center

(57) ABSTRACT

A machine learning apparatus determines an order in which numerical values in an input dataset are to be entered to a neural network for data classification, based on a reference pattern that includes an array of reference values to provide a criterion for ordering the numerical values. The machine learning apparatus then calculates an output value of the neural network whose input-layer neural units respectively receive the numerical values arranged in the determined order. The machine learning apparatus further calculates an input error at the input-layer neural units, based on a difference between the calculated output value and a correct classification result indicated by a training label. The machine learning apparatus updates the reference values in the reference pattern, based on the input error at the input-layer neural units.

6 Claims, 18 Drawing Sheets

(56) References Cited

U.S. PATENT DOCUMENTS

| | | | | |
|---|---|---|---|---|
| 9,767,414 B2* | 9/2017 | Maruhashi | ............. | G06N 7/005 |
| 9,824,157 B2* | 11/2017 | Maruhashi | ........ | G06F 16/24578 |
| 10,186,060 B2* | 1/2019 | Maruhashi | .............. | G06F 21/00 |
| 10,366,109 B2* | 7/2019 | Maruhashi | ............ | G06F 16/285 |

* cited by examiner

FIG. 14

METHOD AND APPARATUS FOR MACHINE LEARNING

CROSS-REFERENCE TO RELATED APPLICATION

This application is based upon and claims the benefit of priority of the prior Japanese Patent Application No. 2016-193675, filed on Sep. 30, 2016, the entire contents of which are incorporated herein by reference.

FIELD

The embodiments discussed herein relate to a machine learning method and a machine learning apparatus.

BACKGROUND

Artificial neural networks are a computational model used in machine learning. For example, a computer performs supervised machine learning by entering input data to the input layer of a neural network and executing predefined processing operations on the entered input data, with respect to each individual neural unit in the neural network. When the processing reaches the output layer of the neural network, the computer generates output data from the processing result in that layer. The computer compares this output data with correct values specified in labeled training data associated with the input dataset and modifies the neural network so as to reduce their differences, if any. The computer repeats the above procedure, thereby making the neural network learn the rules for classifying given input data at a specific accuracy level. Such neural networks may be used to classify a communication log collected in a certain period and detect a suspicious activity that took place in that period.

One example of neural network-based techniques is a character recognition device that recognizes text with accuracy by properly classifying input character images. Another example is a high-speed learning method for neural networks. The proposed method prevents oscillatory modification of a neural network by using differential values, thus achieving accurate learning. Yet another example is a learning device for neural networks that is designed for quickly processing multiple training datasets evenly, no matter whether an individual training dataset works effectively, what categories their data patterns belong to, or how many datasets are included in each category. Still another example is a technique for learning convolutional neural networks. This technique orders neighboring nodes of each node in graph data and assigns equal weights to connections between those neighboring nodes.

Japanese Laid-open Patent Publication No. 8-329196
Japanese Laid-open Patent Publication No. 9-81535
Japanese Laid-open Patent Publication No. 9-138786
Mathias Niepert et al., "Learning Convolutional Neural Networks for Graphs," Proceedings of the 33rd International Conference on Machine Learning (ICML 2016), June 2016

In some cases of learning a neural network model of relationships between individuals or objects, the order of values entered to the input layer may affect output values that the output layer yields. This means that the input values have to be arranged in a proper order to achieve accurate machine learning. The conventional techniques, however, determine the order of input values regardless of classification accuracy, thus resulting in a poor accuracy of classification results.

SUMMARY

In one aspect, there is provided a non-transitory computer-readable storage medium storing a learning program that causes a computer to perform a procedure including: obtaining an input dataset including a set of numerical values and a training label indicating a correct classification result corresponding to the input dataset; determining an input order in which the numerical values in the input dataset are to be entered to a neural network for data classification, based on a reference pattern that includes an array of reference values to provide a criterion for ordering the numerical values; calculating an output value of the neural network whose input-layer neural units respectively receive the numerical values arranged in the input order; calculating an input error at the input-layer neural units of the neural network, based on a difference between the calculated output value and the correct classification result indicated by the training label; and updating the reference values in the reference pattern, based on the input error at the input-layer neural units.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a third diagram illustrating a machine learning process by way of example;

DESCRIPTION OF EMBODIMENTS

Several embodiments will be described below with reference to the accompanying drawings. These embodiments may be combined with each other, unless they have contradictory features.

(a) First Embodiment

Figure 1:
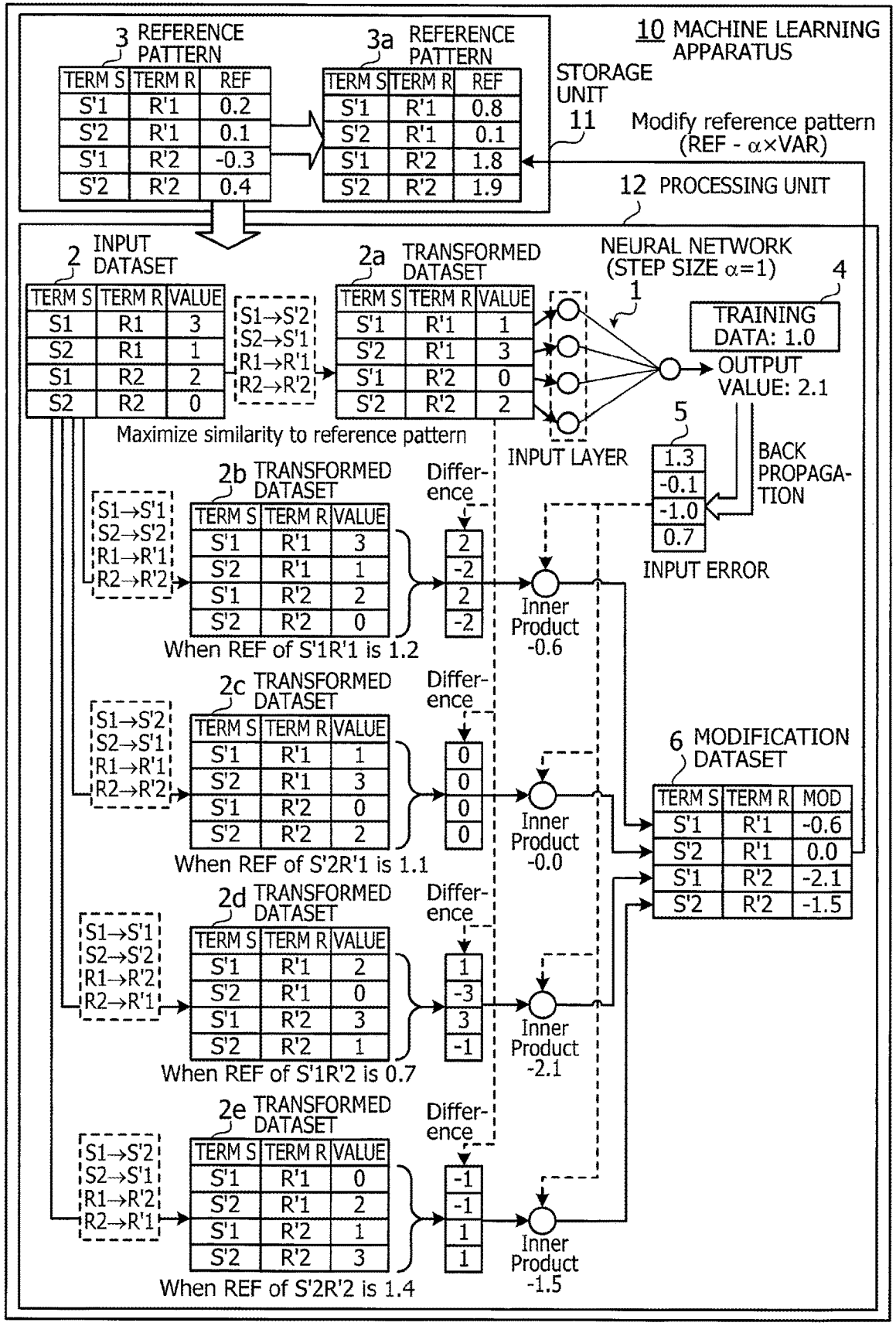
FIG. 1 illustrates an example of a machine learning apparatus according to a first embodiment.

The description begins with a machine learning apparatus according to a first embodiment. FIG. 1 illustrates an example of a machine learning apparatus according to the first embodiment. The illustrated machine learning apparatus 10 includes a storage unit 11 and a processing unit 12. For example, this machine learning apparatus 10 may be a computer. The storage unit 11 may be implemented as part of, for example, a memory or other storage device in the machine learning apparatus 10. The processing unit 12 may be implemented as, for example, a processor in the machine learning apparatus 10.

The storage unit 11 stores therein a reference pattern 3, or an array of reference values (REF in FIG. 1). This reference pattern 3 provides a criterion for ordering numerical values before they are entered to a neural network 1 for the purpose of classifying data.

The processing unit 12 obtains an input dataset 2 and its associated training data 4 (also referred to as a "training label" or "supervisory signal"). The input dataset 2 includes a set of numerical values. Then based on the above reference pattern 3, the processing unit 12 determines an input order of numerical values in the input dataset 2, thus generating a transformed dataset 2a. Referring to the example of FIG. 1, the topmost record of the transformed dataset 2a contains the numerical value that is entered to the first neural unit in the neural network 1. Subsequent records in the transformed dataset 2a contain numerical values to be respectively entered to the second neural unit and so on. For example, the processing unit 12 generates a first vector by arranging numerical values, as its first element to its last element, in the order of their entry. The reference pattern 3, on the other hand, has a set of reference values, which form a second vector. The processing unit 12 finalizes the order of entry of input values by modifying the order of elements in the first vector, such that the inner product of the first and second vectors is maximized.

In accordance with the determined input order, the processing unit 12 enters the rearranged numerical values to corresponding neural units (i.e., artificial neurons) in the input layer of the neural network 1. The processing unit 12 then calculates an output value of the neural network 1 on the basis of the entered numerical values. Referring to FIG. 1, the input-layer neural units are arranged in the vertical direction, in accordance with the order of numerical values entered to the neural network 1. That is, the topmost neural unit receives the first numerical value, and the bottommost neural unit receives the last numerical value. Each neural unit in the input layer is supposed to receive a single numerical value.

The processing unit 12 now calculates an output error that the output value exhibits with respect to the training data 4, and then calculates an input error 5, based on the output error, for the purpose of correcting the neural network 1. This input error 5 is a vector representing errors of individual input values given to the input-layer neural units. For example, the processing unit 12 calculates an input error 5 by performing backward propagation (also known as "back-propagation") of the output error over the neural network 1.

Based on the input error 5 calculated above, the processing unit 12 updates reference values in the reference pattern 3. For example, the processing unit 12 selects reference values in the reference pattern 3 one by one for the purpose of modification described below. That is, the processing unit 12 performs the following processing operations with each selected reference value.

The processing unit 12 creates a temporary reference pattern (not illustrated in FIG. 1) by temporarily increasing or decreasing the selected reference value by a specified amount. Based on this temporary reference pattern, the processing unit 12 then determines a tentative order of numerical input values. For example, the processing unit 12 rearranges numerical values given in the input dataset 2 in such a way that the resulting order will exhibit a maximum similarity to the temporary reference pattern, thus generating a transformed dataset corresponding to the selected reference value. As seen in the example of FIG. 1, four transformed datasets 2b to 2e have numerical values arranged in different tentative input orders.

Subsequently the processing unit 12 calculates a difference of numerical values between the input order determined with the original reference pattern 3 and the tentative input order determined with the temporary reference pattern.

The processing unit 12 then determines whether to increase or decrease the selected reference value in the reference pattern 3, on the basis of the input error 5 and the difference calculated above. For example, the processing unit 12 treats the input error 5 as a third vector and the above difference in numerical values as a fourth vector. The processing unit 12 determines to what extent it needs to raise or reduce the selected reference value, on the basis of an inner product of the third and fourth vectors. In the example of FIG. 1, the processing unit 12 creates a modification dataset 6 by registering the calculated inner product as a modification value (MOD in FIG. 1) for the selected reference value.

As noted above, the selected reference value has temporarily been increased or decreased by a specified amount. In the former case, the processing unit 12 interprets a positive inner product as suggesting that the selected reference value needs to be reduced, and a negative inner product as suggesting that the selected reference value needs to be raised. In the latter case, the processing unit 12 interprets a positive inner product as suggesting that the selected reference value needs to be raised, and a negative inner product as suggesting that the selected reference value needs to be reduced.

The processing unit 12 executes the above procedure for each individual reference value in the reference pattern 3, thus calculating a full set of modification values. The processing unit 12 now updates the reference pattern 3 using the modification dataset 6. Specifically, the processing unit 12 applies modification values to reference values in the reference pattern 3 according to the above-noted interpretation of raising or reducing, thus obtaining an updated reference pattern 3a. For example, the processing unit 12 multiplies the modification values by the step size ($\alpha$) of the neural network 1 (e.g., $\alpha=1$ in FIG. 1) and subtracts the resulting products from corresponding reference values in the reference pattern 3.

Further, the processing unit 12 repeats the above-described updating process for the reference pattern until the amount of modification to reference values falls below a certain threshold (i.e., until the modification causes little difference between the reference pattern before update and the reference pattern after update). Finally, the processing unit 12 obtains a reference pattern that gives a set of proper reference values for rearrangement of an input dataset 2.

Now that the final version of the reference pattern is ready, the processing unit 12 rearranges records of unlabeled input datasets before subjecting them to the trained neural network 1. While the order of numerical values in input datasets may affect the classification result, the use of such reference patterns ensures appropriate arrangement of those numerical values, thus permitting the neural network 1 to achieve correct classification of input datasets.

(b) Second Embodiment

This part of the description explains a second embodiment. The second embodiment is intended to detect suspicious communication activities over a computer network by analyzing communication logs with a neural network.

Figure 2:
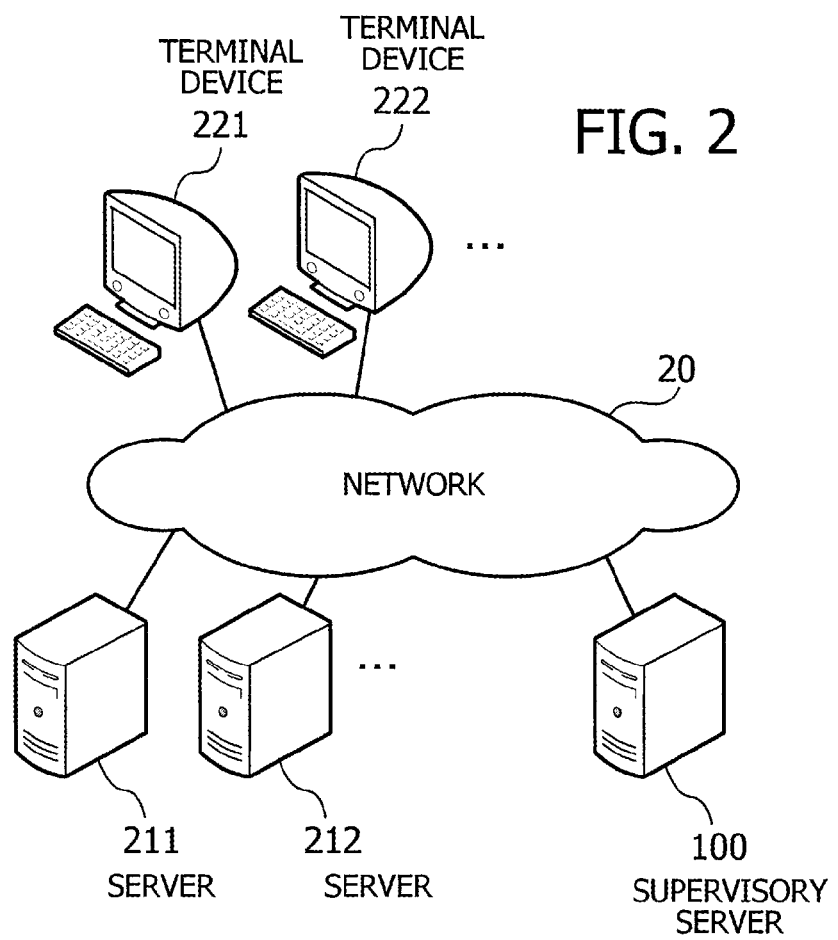
FIG. 2 illustrates an example of system configuration according to a second embodiment.

FIG. 2 illustrates an example of system configuration according to the second embodiment. This system includes servers 211, 212, . . . , terminal devices 221, 222, . . . , and a supervisory server 100, which are connected to a network 20. The servers 211, 212, . . . are computers that provide processing services upon request from terminal devices. Two or more of those servers 211, 212, . . . may work together to provide a specific service. Terminal devices 221, 222, . . . are users' computers that utilize services that the above servers 211, 212, provide.

The supervisory server 100 supervises communication messages transmitted over the network 20 and records them in the form of communication logs. The supervisory server 100 performs machine learning of a neural network using the communication logs, so as to optimize the neural network for use in detecting suspicious communication. With the optimized neural network, the supervisory server 100 detects time periods in which suspicious communication took place.

Figure 3:
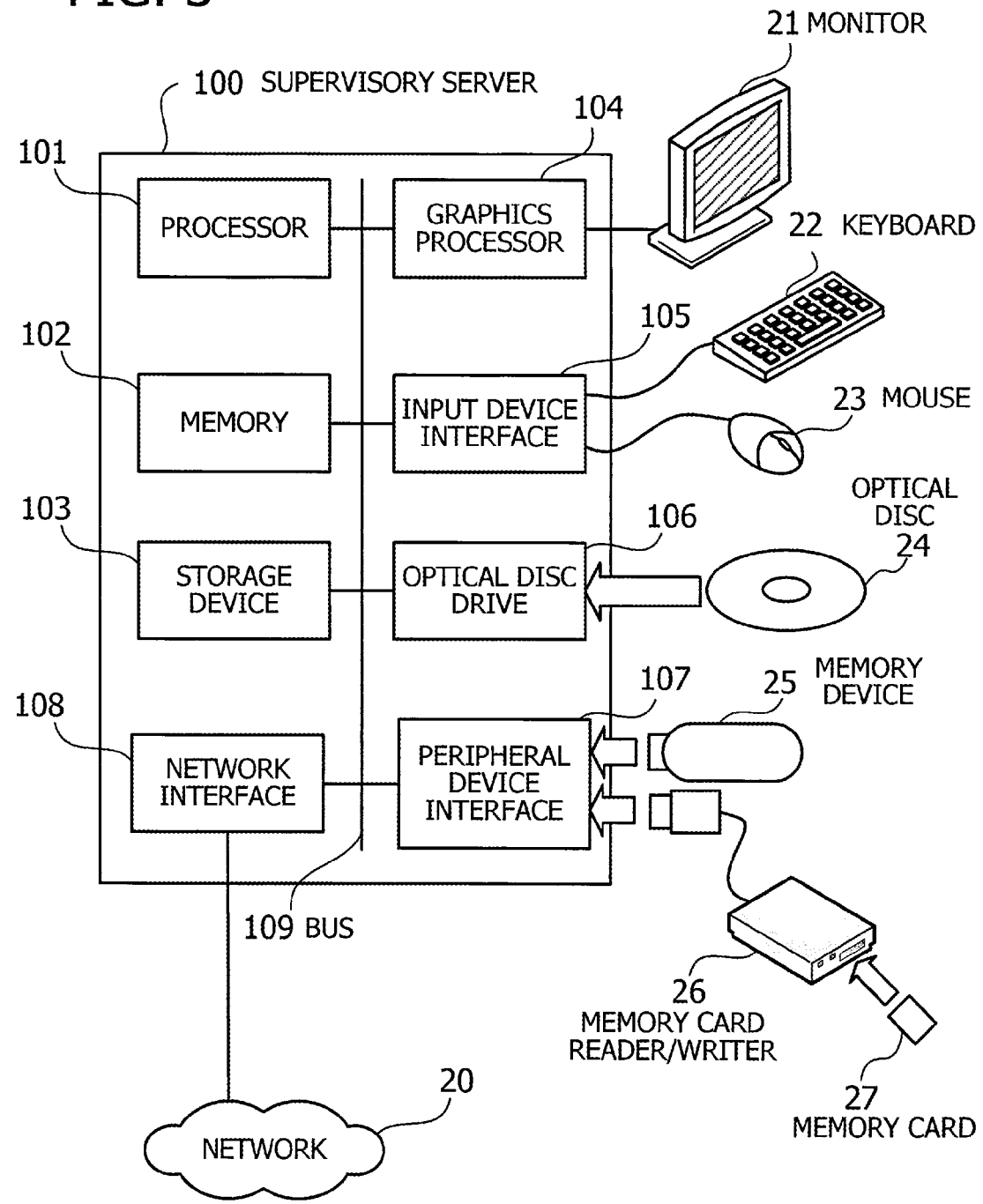
FIG. 3 illustrates an example of hardware configuration of a supervisory server used in the second embodiment.

FIG. 3 illustrates an example of hardware configuration of a supervisory server used in the second embodiment. The illustrated supervisory server 100 has a processor 101 to control its entire operation. The processor 101 is connected to a memory 102 and other various devices and interfaces via a bus 109. The processor 101 may be a single processing device or a multiprocessor system including two or more processing devices, such as a central processing unit (CPU), micro processing unit (MPU), and digital signal processor (DSP). It is also possible to implement processing functions of the processor 101 and its programs wholly or partly into an application-specific integrated circuit (ASIC), programmable logic device (PLD), or other electronic circuits, or any combination of them.

The memory 102 serves as the primary storage device in the supervisory server 100. Specifically, the memory 102 is used to temporarily store at least some of the operating system (OS) programs and application programs that the processor 101 executes, as well as other various data objects that it manipulates at runtime. For example, the memory 102 may be implemented by using a random access memory (RAM) or other volatile semiconductor memory devices.

Other devices on the bus 109 include a storage device 103, a graphics processor 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device in the supervisory server 100 to store program and data files of the operating system and applications. For example, the storage device 103 may be implemented by using hard disk drives (HDD) or solid state drives (SSD).

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices, such as a keyboard 22 and a mouse 23 and supplies signals from those devices to the processor 101. The mouse 23 is a pointing device, which may be replaced with other kind of pointing devices, such as a touchscreen, tablet, touchpad, and trackball.

The optical disc drive 106 reads out data encoded on an optical disc 24, by using laser light. The optical disc 24 is a portable data storage medium, the data recorded on which is readable as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the supervisory server 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to a network 20 so as to exchange data with other computers or network devices (not illustrated).

The above-described hardware platform may be used to implement the processing functions of the second embodiment. The same hardware configuration of the supervisory server 100 of FIG. 3 may similarly be applied to the foregoing machine learning apparatus 10 of the first embodiment.

The supervisory server 100 provides various processing functions of the second embodiment by, for example, executing computer programs stored in a computer-readable storage medium. A variety of storage media are available for recording programs to be executed by the supervisory server 100. For example, the supervisory server 100 may store program files in its own storage device 103. The processor 101 reads out at least part of those programs in the storage device 103, loads them into the memory 102, and executes the loaded programs. Other possible storage locations for the server programs include an optical disc 24, memory device 25, memory card 27, and other portable storage medium. The programs stored in such a portable storage medium are installed in the storage device 103 under the control of the processor 101, so that they are ready to execute upon request. It may also be possible for the processor 101 to execute program codes read out of a portable storage medium, without installing them in its local storage devices.

Figure 4:
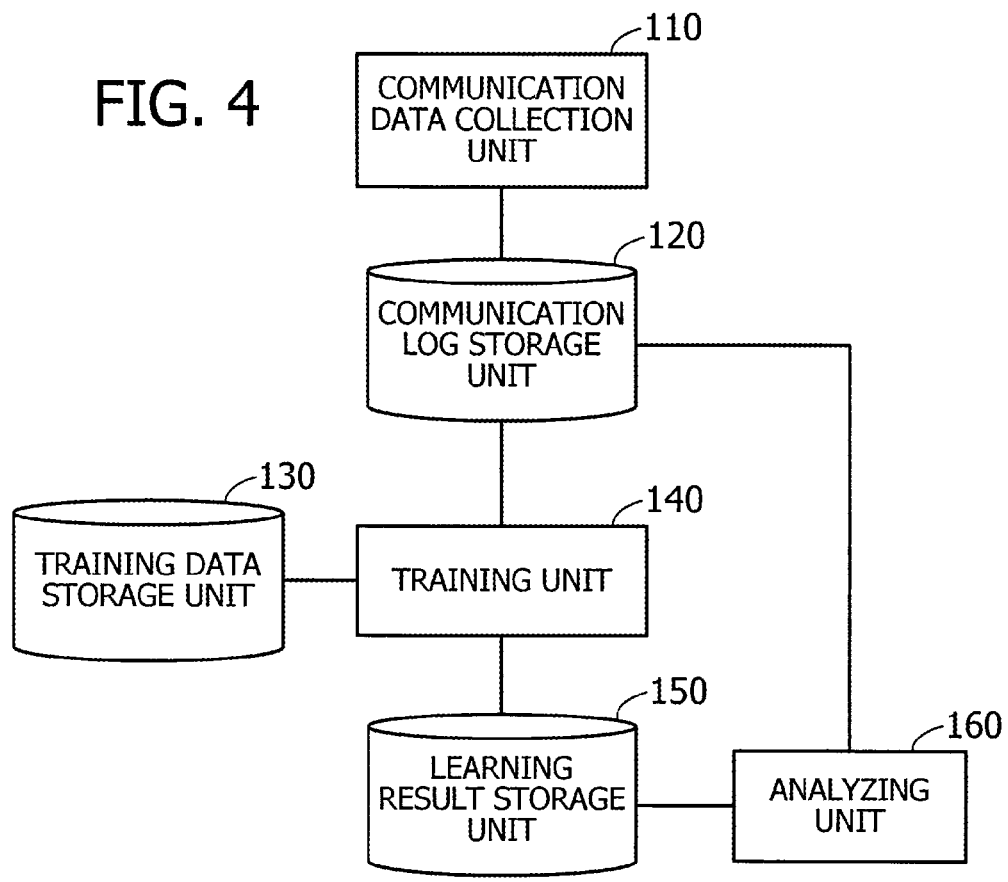
FIG. 4 is a block diagram illustrating an example of functions provided in the supervisory server.

The following part of the description explains what functions the supervisory server provides. FIG. 4 is a block diagram illustrating an example of functions provided in the supervisory server. Specifically, the illustrated supervisory server 100 includes a communication data collection unit 110, a communication log storage unit 120, a training data storage unit 130, a training unit 140, a learning result storage unit 150, and an analyzing unit 160.

The communication data collection unit 110 collects communication data (e.g., packets) transmitted and received over the network 20. For example, the communication data collection unit 110 collects packets passing through a switch placed in the network 20. More specifically, a copy of these packets is taken out of a mirroring port of the switch. It may also be possible for the communication data collection unit 110 to request servers 211, 212, to send their respective communication logs. The communication data collection unit 110 stores the collected communication data in a communication log storage unit 120.

The communication log storage unit 120 stores therein the logs of communication data that the communication data collection unit 110 has collected. The stored data is called "communication logs."

The training data storage unit 130 stores therein a set of records indicating the presence of suspicious communication during each unit time window (e.g., ten minutes) in a specific past period. The indication of suspicious communication or lack thereof may be referred to as "training flags."

The training unit 140 trains a neural network with the characteristics of suspicious communication on the basis of communication logs in the communication log storage unit 120 and training flags in the training data storage unit 130. The resulting neural network thus knows what kind of communication is considered suspicious. For example, the training unit 140 generates a reference pattern for use in rearrangement of input data records for a neural network. The training unit 140 also determines weights that the neural units use to evaluate their respective input values. When the training is finished, the training unit 140 stores the learning results into a learning result storage unit 150, including the neural network, reference pattern, and weights.

The learning result storage unit 150 is a place where the training unit 140 is to store its learning result.

The analyzing unit 160 retrieves from the communication log storage unit 120 a new communication log collected in a unit time window, and analyzes it with the learning result stored in the learning result storage unit 150. The analyzing unit 160 determines whether any suspicious communication took place in that unit time window.

It is noted that the solid lines interconnecting functional blocks in FIG. 4 represent some of their communication paths. The person skilled in the art would appreciate that there may be other communication paths in actual implementations. Each functional blocks seen in FIG. 4 may be implemented as a program module, so that a computer executes the program module to provide its encoded functions.

Figure 5:
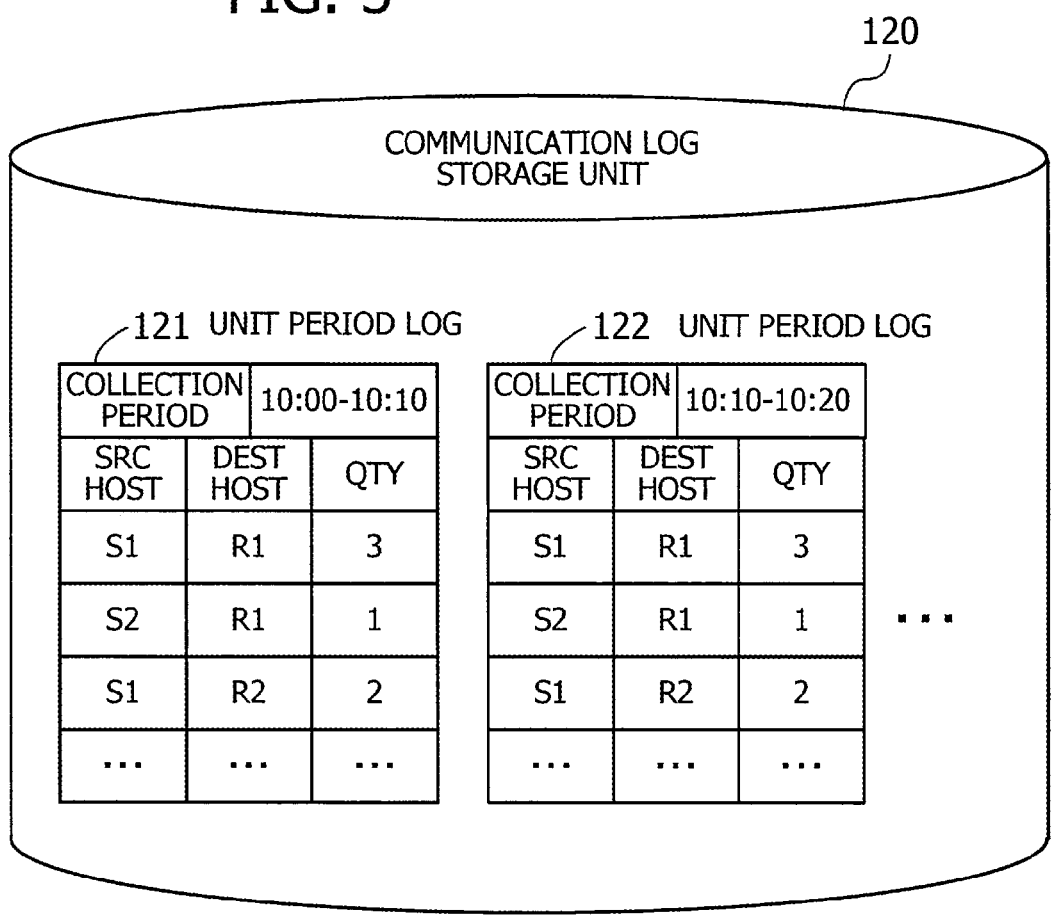
FIG. 5 illustrates an example of a communication log storage unit.

The following description now provides specifics of what is stored in the communication log storage unit 120. FIG. 5 illustrates an example of a communication log storage unit. The illustrated communication log storage unit 120 stores therein a plurality of unit period logs 121, 122, ..., each containing information about the collection period of a communication log, followed by the communication data collected within the period.

Each record of the unit period logs 121, 122, ... is formed from data fields named "Source Host" (SRC HOST), "Destination Host" (DEST HOST), and "Quantity" (QTY). The source host field contains an identifier that indicates the source host device of a packet, and the destination host field contains an identifier that indicates the destination host device of that packet. The quantity field indicates the number of communications that occurred between the same source host and the same destination host in the unit period log of interest. The unit period logs 121, 122, ... may further have an additional data field to indicate which port was used for communication (e.g., destination TCP/UDP port number).

Figure 6:
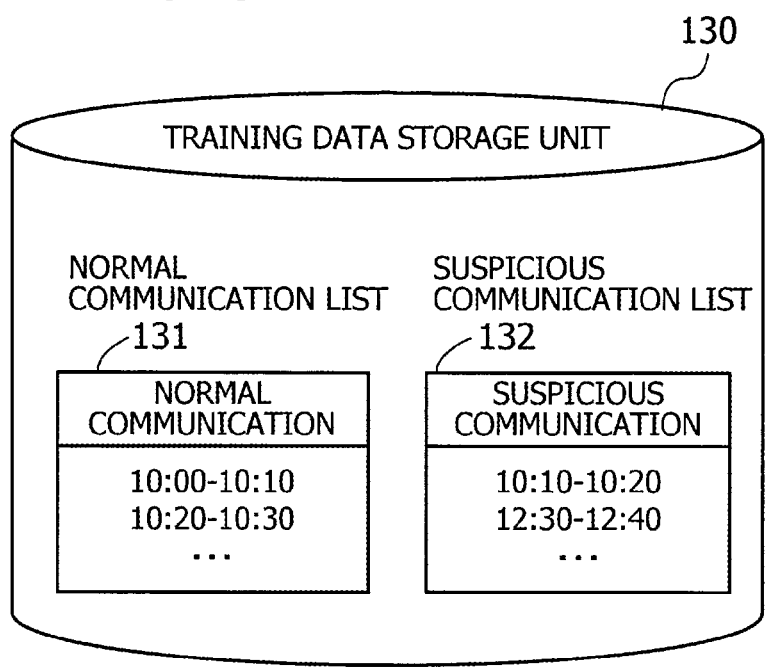
FIG. 6 illustrates an example of a training data storage unit.

The next description provides specifics of what is stored in the training data storage unit 130. FIG. 6 illustrates an example of a training data storage unit. The illustrated training data storage unit 130 stores therein a normal communication list 131 and a suspicious communication list 132. The normal communication list 131 enumerates unit periods in which normal communication took place. The suspicious communication list 132 enumerates unit periods in which suspicious communication took place. The unit periods may be defined by, for example, an administrator of the system.

As part of a machine learning process, training labels are determined for communication logs collected in different unit periods. Each training label indicates a desired (correct) output value that the neural network is expected to output when a communication log is given as its input dataset. The values of training labels depend on whether their corresponding unit periods are registered in the normal communication list 131 or in the suspicious communication list 132. For example, the training unit 140 assigns a training label of "1.0" to a communication log of a specific unit period registered in the normal communication list 131. The training unit 140 assigns a training label of "0.0" to a communication log of a specific unit period registered in the suspicious communication list 132.

Figure 7:
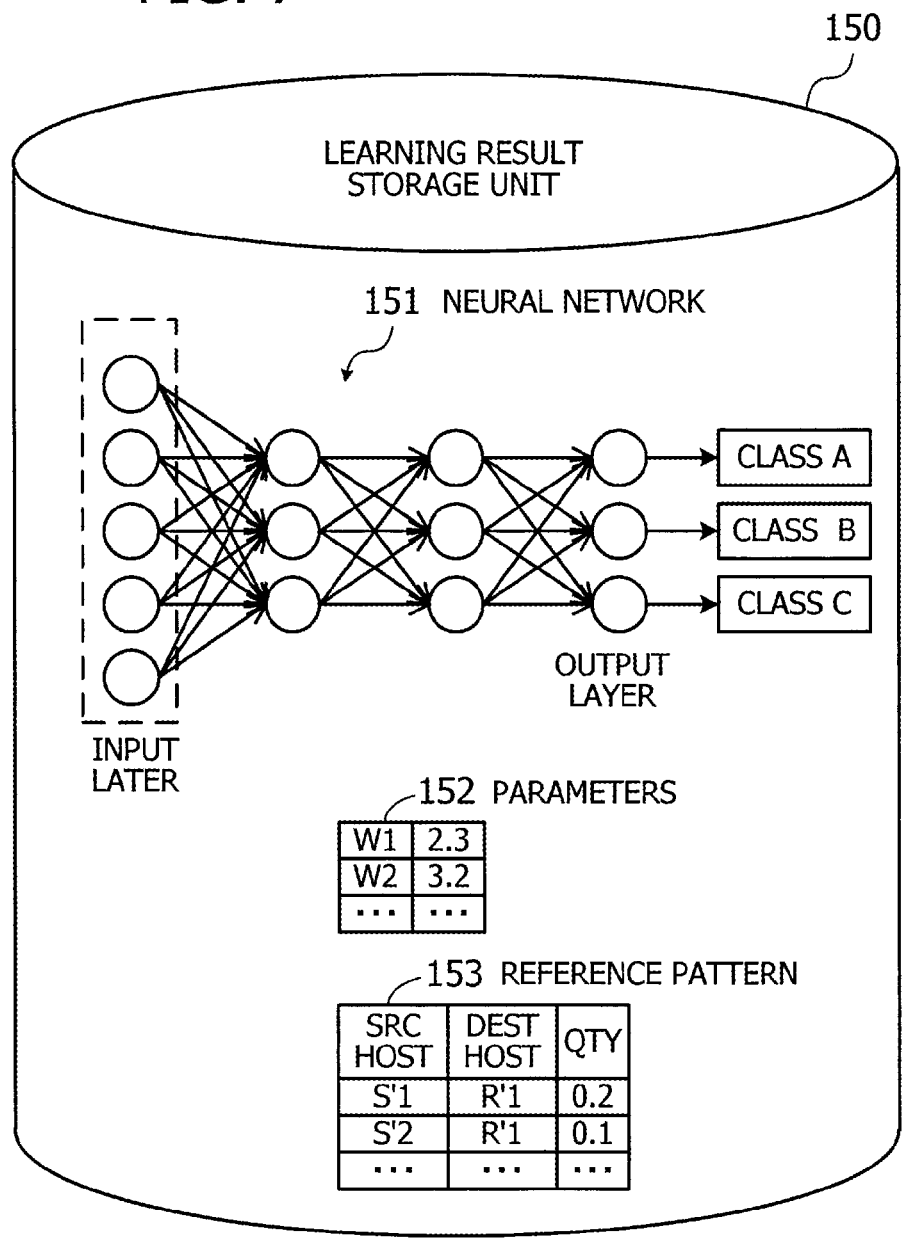
FIG. 7 illustrates an example of a learning result storage unit.

The next description provides specifics of what is stored in the learning result storage unit 150. FIG. 7 illustrates an example of a learning result storage unit. The illustrated learning result storage unit 150 stores therein a neural network 151, parameters 152, and a reference pattern 153. These things are an example of the result of a machine learning process.

The neural network 151 is a network of neural units (i.e., elements representing artificial neurons) with a layered structure, from input layer to output layer. FIG. 7 expresses neural units in the form of circles. The arrows connecting neural units represent the flow of signals. Each neural unit executes predetermined processing operations on its input signals and accordingly determines an output signal to neural units in the next layer. The neural units in the output layer generate their respective output signals. Each of these output signals will indicate a specific classification of an input dataset when it is entered to the neural network 151. For example, the output signals indicate whether the entered communication log includes any sign of suspicious communication.

The parameters 152 include weight values, each representing the strength of an influence that one neural unit exerts on another neural unit. The weight values are respectively assigned to the arrows interconnecting neural units in the neural network 151.

The reference pattern 153 is a dataset used for rearranging records in a unit period log. Constituent records of a unit period log are rearranged when they are subjected to the neural network 151, such that the rearranged records will be more similar to the reference pattern 153. For example, the reference pattern 153 is formed from records each including three data fields named: "Source Host" (SRC HOST), "Destination Host" (DEST HOST), and "Quantity" (QTY). The source host field and destination host fields contain identifiers used for the purpose of analysis using the neural network 151. Specifically, the source host field of a record indicates a specific host that serves as a source entity in communication events. The destination host field indicates a specific host that serves as a destination entity in communication events. The quantity field indicates the probability of occurrence of communication events between a specific combination of source and destination hosts during a unit period.

Figure 8:
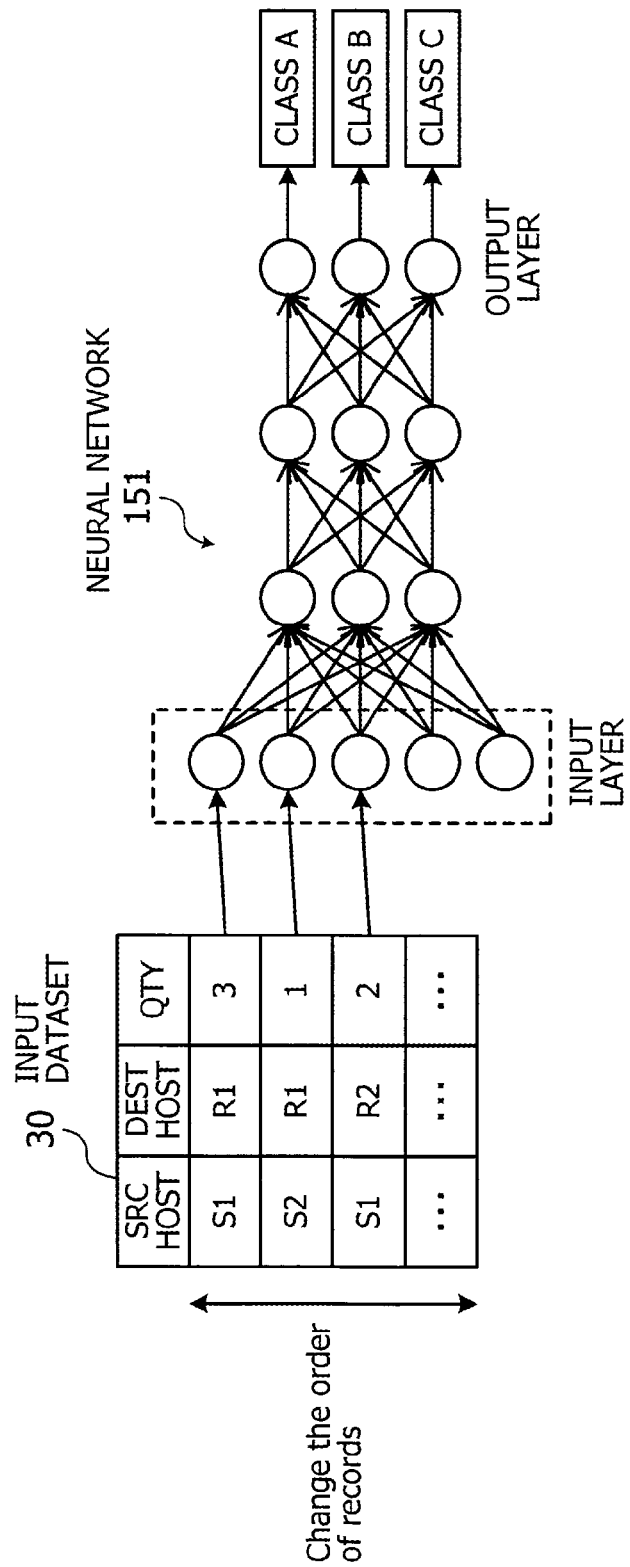
FIG. 8 illustrates a data classification method.

The next part of the description explains how data is classified using the neural network 151. FIG. 8 illustrates a data classification method. For example, it is assumed that one unit period log is entered as an input dataset 30 to the analyzing unit 160. The analyzing unit 160 is to classify this input dataset 30 by using the neural network 151.

Individual records in the input dataset 30 are each assigned to one neural unit in the input layer of the neural network 151. The quantity-field value of each assigned record is entered to the corresponding neural unit as its input value. These input values may be normalized at the time of their entry to the input layer.

The example seen in FIG. 8 classifies a given input dataset 30 into three classes, depending on the relationships between objects (e.g., the combinations of source host and destination host) in the input dataset 30. However, it is often unknown which neural unit is an appropriate place to enter which input record. Suppose, for example, that a certain suspicious communication event takes place between process Pa in one server and process Pb in another server. The detection conditions for suspicious communication hold when server A executes process Pa and server B executes process Pb, as well as when server B executes process Pa and server A executes process Pb. As this example suggests, suspicious communication may be detected with various combination patterns of hosts.

In view of the above, the records of the input dataset 30 are rearranged before they are entered to the neural network 151, so as to obtain a correct answer about the presence of suspicious communication activities. For example, some part of relationships make a particularly considerable contribution to classification results, and such partial relationships appear regardless of the entire structure of relationships between variables. In this case, a neural network may be unable to classify the input datasets with accuracy if the noted relationships are assigned to inappropriate neural units in the input layer.

The conventional methods for rearrangement of relationship-indicating records, however, do not care about the accuracy of classification. It is therefore highly likely to overlook a better way of arrangement that could achieve more accurate classification of input datasets. One simple alternative strategy may be to generate every possible pattern of ordered input data records and try each such pattern with the neural network 151. But this alternative would only end up with too much computational load. Accordingly, the second embodiment has a training unit 140 configured to generate an optimized reference pattern 153 that enables rearrangement of records for accurate classification without increasing computational loads.

Figure 9:
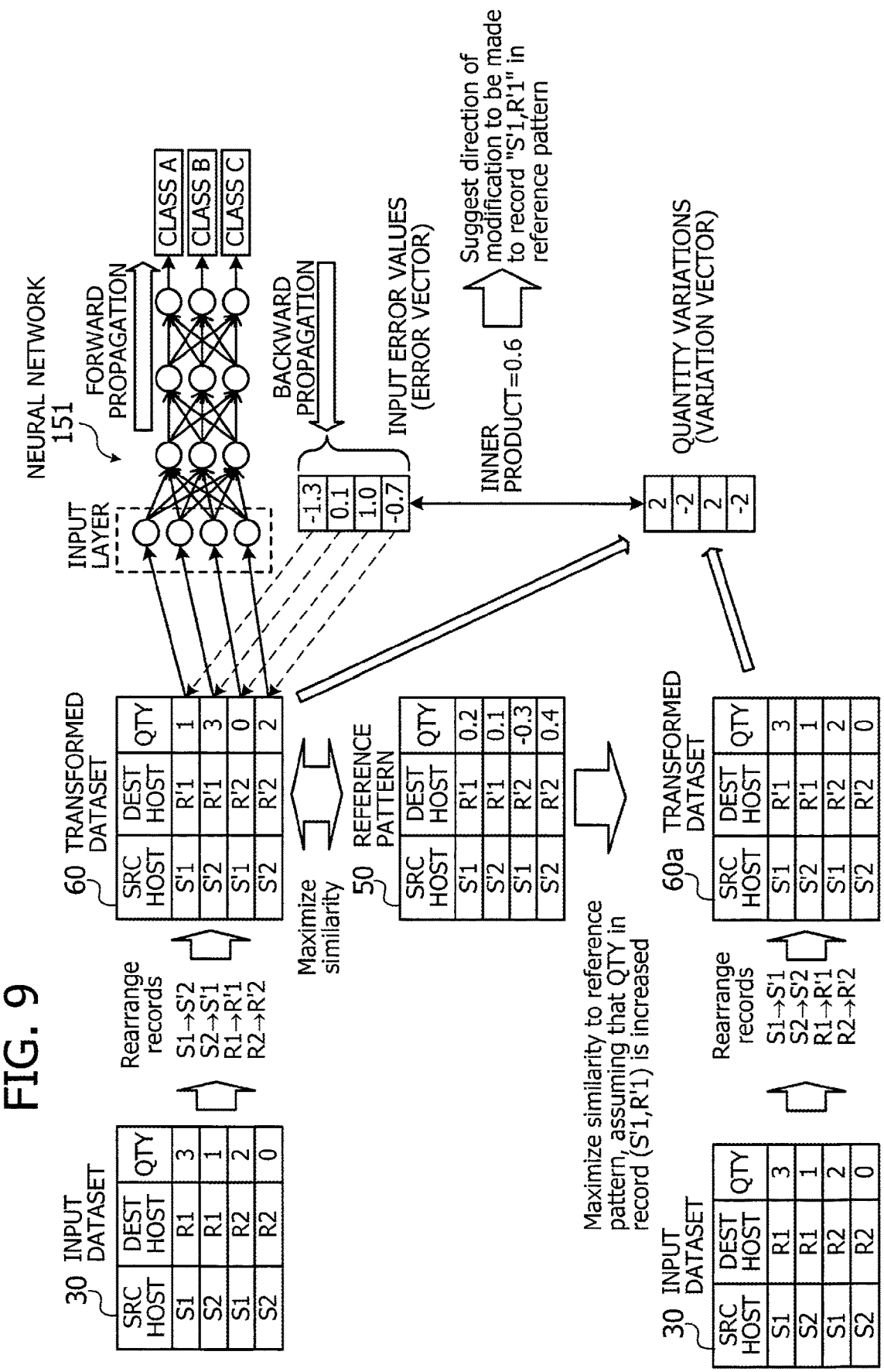
FIG. 9 presents an overview of how to optimize a reference pattern.

FIG. 9 presents an overview of how to optimize a reference pattern. The training unit 140 first gives initial values for a reference pattern 50 under development. Suppose, for example, the case of two source hosts and two destination hosts. The training unit 140 in this case generates two source host identifiers "S'1" and "S'2" and two destination host identifiers "R'1" and "R'2." The training unit 140 further combines a source host identifier and a destination host identifier in every possible way and gives an initial value of quantity to each combination. These initial quantity values may be, for example, random values. The training unit 140 now constructs a reference pattern 50 including multiple records each formed from a source host identifier, a destination host identifier, and an initial quantity value.

Subsequently the training unit 140 obtains a communication log of a unit period as an input dataset 30, out of the normal communication list 131 or suspicious communication list 132 in the training data storage unit 130. The training unit 140 then rearranges records of the input dataset 30, while remapping their source host identifiers and destination host identifiers into the above-noted identifiers for use in the reference pattern 50, thus yielding a transformed dataset 60. This transformed dataset 60 has been generated so as to provide a maximum similarity to the reference pattern 50, where the similarity is expressed as an inner product of vectors each representing quantity values of records. Note that source host identifiers in the input dataset 30 are associated one-to-one with source host identifiers in the reference pattern 50.

In the above process of generating a transformed dataset 60, the training unit 140 generates every possible vector by rearranging quantity values in the input dataset 30 and assigning the resulting sequence of quantity values as vector elements. These vectors are referred to as "input vectors." The training unit 140 also generates a reference vector from the reference pattern 50 by extracting its quantity values in the order of records in the reference pattern 50. The training unit 140 then calculates an inner product of each input vector and the reference vector and determines which input vector exhibits the largest inner product. The training unit 140 transforms source and destination host identifiers in the input dataset 30 to those in the reference pattern 50 such that the above-determined input vector will be obtained.

Referring to the example of FIG. 9, the training unit 140 finds input vector (1, 3, 0, 2) as providing the largest inner product with reference vector (0.2, 0.1, −0.3, 0.4). Accordingly, relationship "S1, R1" of the first record with a quantity value of "3" in the input dataset 30 is transformed to "S'2, R'1" in the transformed dataset 60 such that the record will take the second position in the transformed dataset 60. Relationship "S2, R1" of the second record with a quantity value of "1" in the input dataset 30 is transformed to "S'1, R'1" in the transformed dataset 60 such that the record will take the first position in the transformed dataset 60. Relationship "S1, R2" of the third record with a quantity value of "2" in the input dataset 30 is transformed to "S'2, R'2" in the transformed dataset 60 such that the record will take the fourth position in the transformed dataset 60. Relationship "S2, R2" of the fourth record with a quantity value of "0" in the input dataset 30 is transformed to "S'1, R'2" in the transformed dataset 60 such that the record will take the third position in the transformed dataset 60. As this example illustrates, the order of quantity values is determined in the first place, which is followed by transformation of source and destination host identifiers.

As can be seen from the above description, the second embodiment determines the order of records in an input dataset 30 on the basis of a reference pattern 50. In addition, the training unit 140 defines an optimal standard for rearranging records of the input dataset 30 by optimizing the above reference pattern 50 using backward propagation in a neural network. Details of this optimization process will now be described below.

Upon generation of a transformed dataset 60, the training unit 140 enters the quantity values in the transformed dataset 60 to their corresponding neural units in the input layer of the neural network 151. The training unit 140 calculates signals that propagate forward over the neural network 151. The training unit 140 compares the resulting output values in the output layer with correct values given in the training data storage unit 130. The difference between the two sets of values indicates an error in the neural network 151. The training unit 140 then performs backward propagation of the error. Specifically, the training unit 140 modifies connection weights in the neural network 151 so as to reduce the error. The training unit 140 also applies backward propagation to the input layer, thereby calculating an error in neural input values. This error in the input layer is represented in the form of an error vector. In the example of FIG. 9, an error vector (−1.3, 0.1, 1.0, −0.7) is calculated.

The training unit 140 further calculates variations of the quantity values in the transformed dataset 60 with respect to a modification made to the reference pattern 50. For example, the training unit 140 assumes a modified version of the reference pattern 50 in which the quantity value of "S'1, R'1" is increased by one. The training unit 140 then generates a transformed dataset 60a that exhibits the closest similarity to the modified reference pattern. This transformed dataset 60a is generated in the same way as the foregoing transformed dataset 60, except that a different reference pattern is used. For example, the training unit 140 generates a temporary reference pattern by giving a modified quantity value of "1.2" (0.2+1) to the topmost record "S'1, R'1" in the reference pattern 50. The training unit 140 then rearranges records of the input dataset 30 to maximize its similarity to the temporary reference pattern, thus yielding a transformed dataset 60a. As the name implies, the temporary reference pattern is intended only for temporary use to evaluate how a modification in one quantity value in the reference pattern 50 would influence the transformed dataset 60. A change made to the reference pattern 50 in its quantity value causes the training unit 140 to generate a new transformed dataset 60a different from the previous transformed dataset 60.

The training unit 140 now calculates variations in the quantity field of the newly generated transformed dataset 60a with respect to the previous transformed dataset 60. For example, the training unit 140 subtracts the quantity value of each record in the previous transformed dataset 60 from the quantity value of the counterpart record in the new transformed dataset 60a, thus obtaining a variation vector (2, −2, 2, −2) representing quantity variations.

The training unit 140 then calculates an inner product of the foregoing error vector and the variation vector calculated above. The calculated inner product suggests the direction and magnitude of a modification to be made to the quantity field of record "S'1, R'1" in the reference pattern 50. As noted above, the quantity value of record "S'1, R'1" in the reference pattern 50 has temporarily been increased by one. If this modification causes an increase of classification error, the inner product will have a positive value. Accordingly, the training unit 140 multiplies the inner product by a negative real value. The resulting product indicates the direction of modifications to be made to (i.e., whether to increase or decrease) the quantity field of record "S'1, R'1" in the reference pattern 50. For example, the training unit 140 adds this product to the current quantity value of record "S'1, R'1," thus making the noted modification in the quantity. In the case where two or more input datasets, the training unit 140 may modify the quantity values of their respective records "S'1, R'1" according to an average of inner products calculated for those input datasets.

The reference pattern 50 has other records than the record "S'1, R'1" discussed above and their respective quantity values. The training unit 140 generates more transformed datasets, assuming that each of those quantity values is increased by one, and accordingly modifies the reference pattern 50 in the way discussed above.

As can be seen from the above description, the training unit 140 is designed to investigate how the reference pattern deviates from what it ought to be, such that the classification error would increase, and determines the amount of such deviation. This is achieved by calculating a product of an error in the input layer (i.e., indicating the direction of quantity variations in a transformed dataset that increase classification error) and quantity variations observed in a transformed dataset as a result of a change made to the reference pattern.

Figure 10:
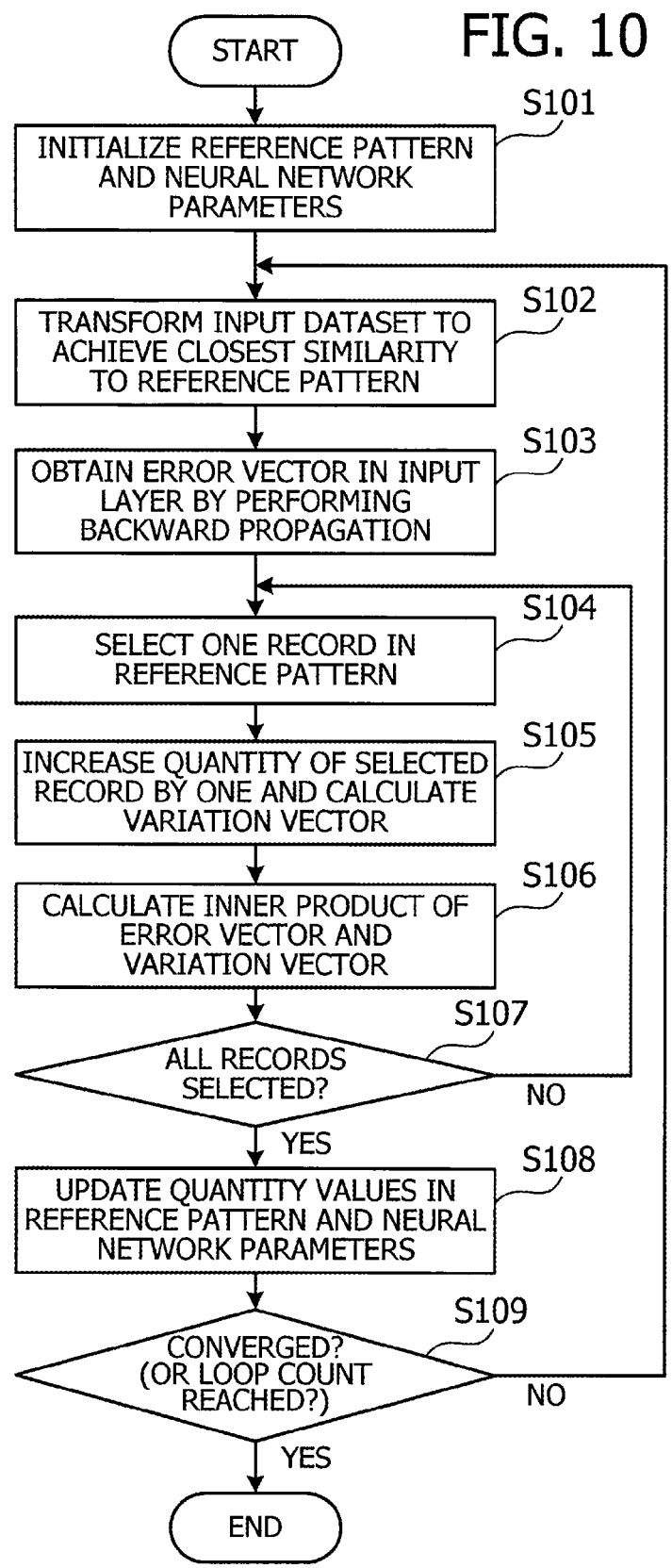
FIG. 10 is an example of a flowchart illustrating a machine learning process.

The description will now provide details of how the training unit 140 performs a machine learning process. FIG. 10 is an example of a flowchart illustrating a machine learning process. Each operation in FIG. 10 is described below in the order of step numbers.

(Step S101) The training unit 140 initializes a reference pattern and parameters representing weights of inputs to neural units constituting a neural network. For example, the training unit 140 fills out the quantity field of records in the reference pattern with randomly generated values. The training unit 140 also assigns randomly generated values to the weights.

(Step S102) The training unit 140 transforms an input dataset in such a way that it will have the closest similarity to the reference pattern, thus generating a transformed dataset.

(Step S103) The training unit 140 performs forward propagation of signals over the neural network and backward propagation of output error, thus obtaining an error vector in the input layer.

(Step S104) The training unit 140 selects one pending record out of the reference pattern.

(Step S105) The training unit 140 calculates a variation vector representing quantity variations in a transformed dataset that is generated with an assumption that the quantity value of the selected record is increased by one.

(Step S106) The training unit 140 calculates an inner product of the error vector obtained in step S103 and the variation vector calculated in step S105. The training unit 140 interprets this inner product as a modification to be made to the selected record.

(Step S107) The training unit 140 determines whether the records in the reference pattern have all been selected. If all records are selected, the process advances to step S108. If any pending record remains, the process returns to step S104.

(Step S108) The training unit 140 updates the quantity values of the reference pattern, as well as the weight parameters of the neural network. For example, the training unit 140 adds the modification values of calculated in step S106 to their corresponding quantity values in the reference pattern. The training unit 140 also updates weight parameters with their modified values obtained in the backward propagation.

(Step S109) The training unit 140 determines whether the process has reached its end condition. For example, the training unit 140 determines that an end condition is reached when quantity values in the reference pattern and weight parameters in the neural network appear to be converged, or when the loop count of steps S102 to S108 has reached a predetermined number. Convergence of quantity values in the reference pattern may be recognized if, for example, step S108 finds that no quantity values make a change exceeding a predetermined magnitude. Convergence of weight parameters may be recognized if, for example, step S108 finds that the sum of variations in the parameters does not exceed a predetermined magnitude. In other words, convergence is detected when both the reference pattern and neural network exhibit little change in step S108. The process is terminated when such end conditions are met. Otherwise, the process returns to step S102 to repeat the above processing.

The above-described procedure permits the training unit 140 to execute a machine learning process and thus determine appropriate quantity values in the reference pattern and a proper set of parameter values. Now with reference to FIGS. 11 to 17, a specific example of machine learning will be explained below. It is noted that the field names "Term S" and "Term R" are used in FIGS. 11 to 17 to respectively refer to the source host and destination host of transmitted packets.

Figure 11:
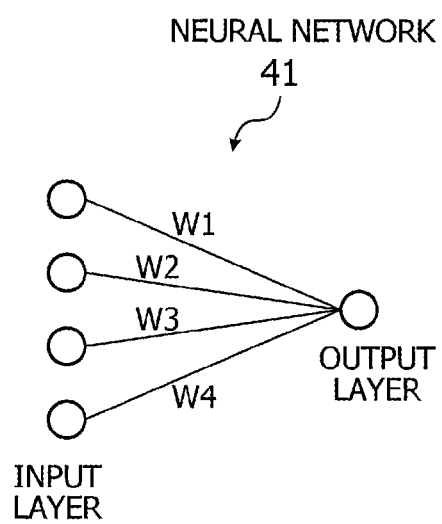
FIG. 11 illustrates an example of a neural network used in machine learning.

FIG. 11 illustrates an example of a neural network used in machine learning. For easier understanding of processes according to the second embodiment, FIG. 11 presents a two-layer neural network 41 formed from four neural units in its input layer and one neural unit in its output layer. It is assumed here that four signals that propagate between the two layers are weighted by given parameters W1, W2, W3, and W4. The training unit 140 performs machine learning with the neural network 41.

Figure 12:
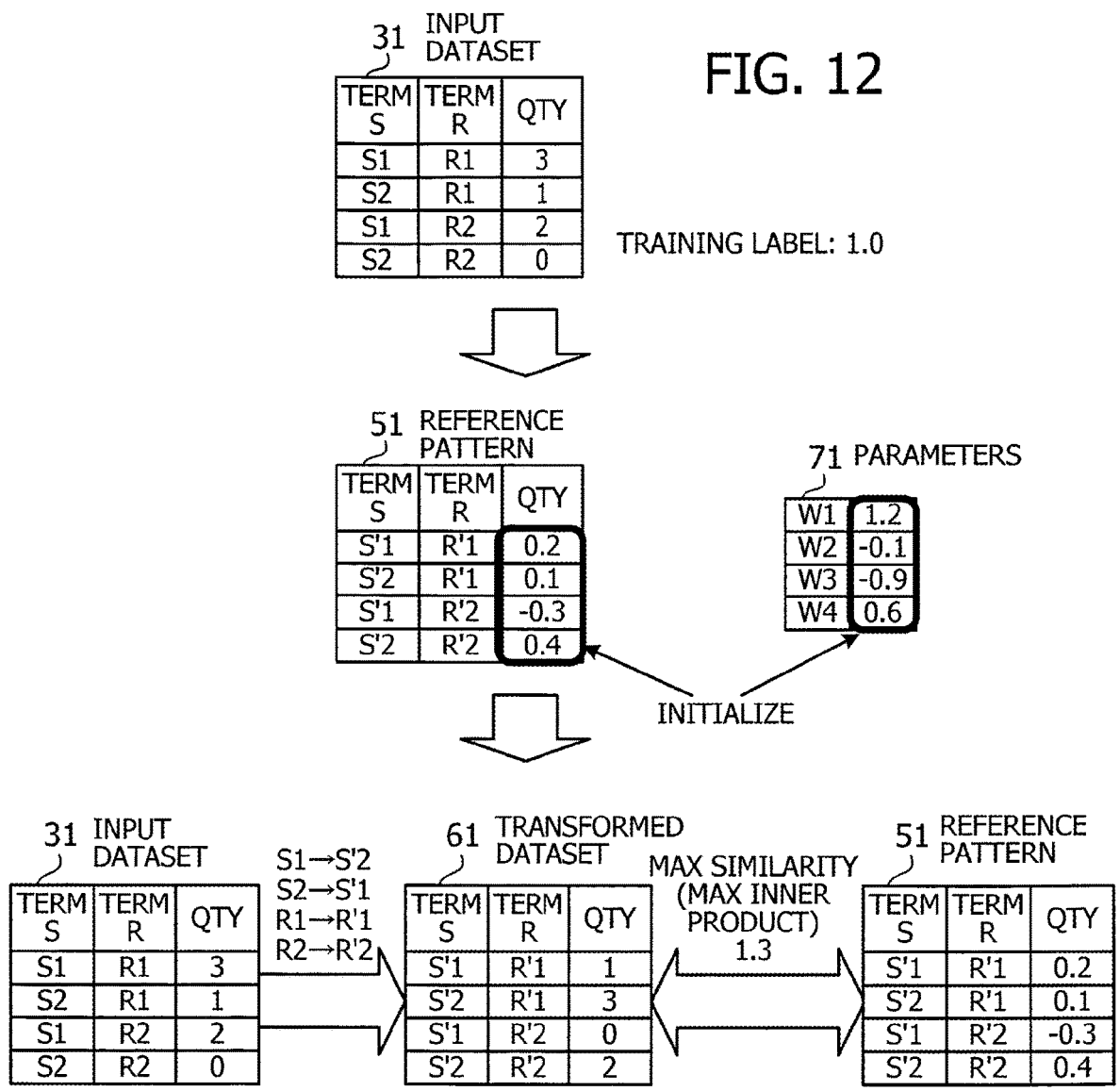
FIG. 12 is a first diagram illustrating a machine learning process by way of example.

FIG. 12 is a first diagram illustrating a machine learning process by way of example. Suppose, for example, that the training unit 140 performs machine learning on the basis of an input dataset 31 with a training label of "1.0." The training unit 140 begins with initializing quantity values in a reference pattern 51 and weight values using parameters 71.

The training unit 140 then rearranges the order of records in the input dataset 31 such that they will have a maximum similarity to the reference pattern 51, thus generating a transformed dataset 61. Referring to the example of FIG. 12, a reference vector (0.2, 0.1, −0.3, 0.4) is created from quantity values in the reference pattern 51, and an input vector (1, 3, 0, 2) is created from quantity values in the transformed dataset 61. The inner product of these two vectors has a value of 1.3.

Figure 13:
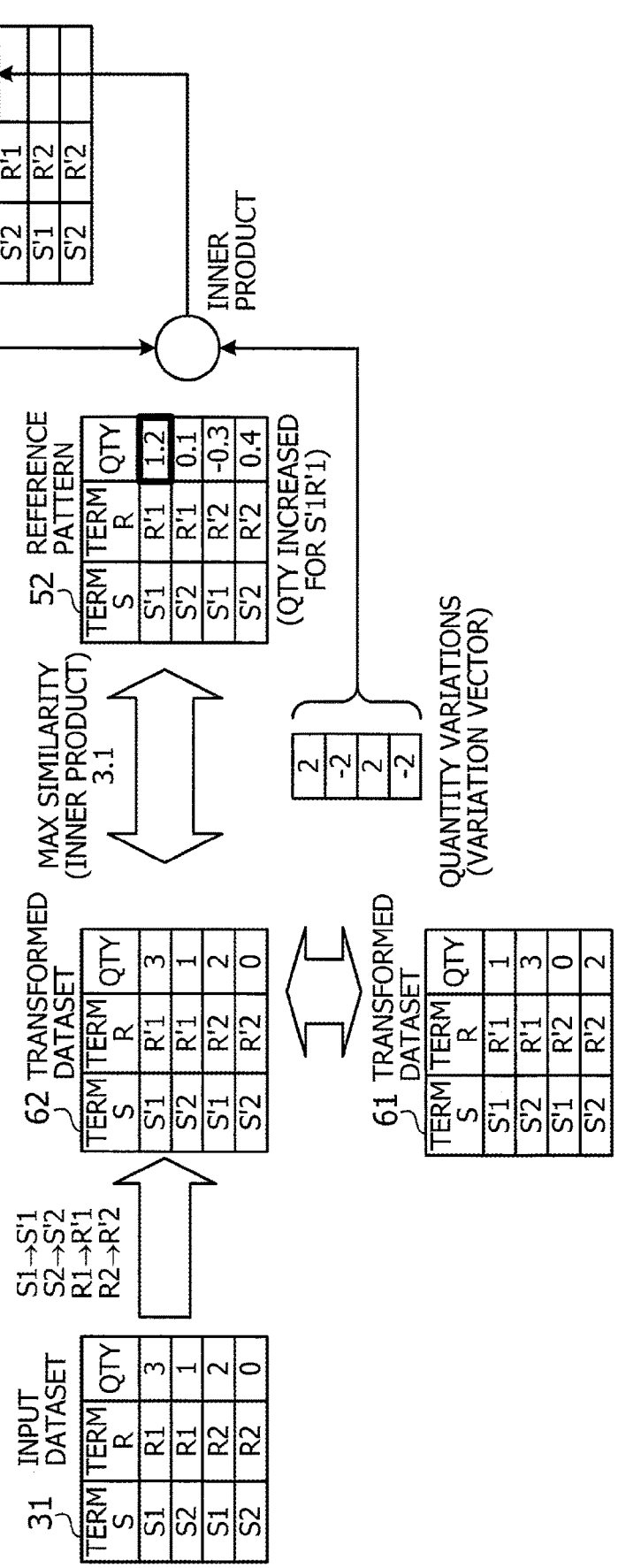
FIG. 13 is a second diagram illustrating a machine learning process by way of example.

FIG. 13 is a second diagram illustrating a machine learning process by way of example. The training unit 140 subjects the above-noted input vector to forward propagation over the neural network 41, thus calculating an output value. For example, the training unit 140 multiplies each element of the input vector by its corresponding weight value (i.e., weight value assigned to the neural unit that receives the vector element). The training unit 140 adds up the products calculated for individual vector elements and outputs the resulting sum as an output value of forward propagation. In the example of FIG. 13, the forward propagation results in an output value of 2.1 since the sum (1×1.2+3×(−0.1)+0×(−0.9)+2×0.6) amounts to 2.1. The training unit 140 now calculates a difference between the output value and training label value. For example, the training unit 140 obtains a difference value of 1.1 by subtracting the training label value 1.0 from the output value 2.1. In other words, the output value exceeds the training label value by an error of 1.1. This error is referred to as an "output error."

The training unit 140 then calculates input error values by performing backward propagation of the output error toward the input layer. For example, the training unit 140 multiplies the output error by a weight value assigned to an input-layer neural unit. The resulting product indicates an input error of the quantity value at that particular neural unit. The training unit 140 repeats the same calculation for other neural units and forms a vector from input error values of four neural units in the input layer. The training unit 140 obtains an error vector (1.3, −0.1, −1.0, 0.7) in this way. Positive elements in an error vector denote that the input values of corresponding neural units are too large. Negative elements in an error vector denote that the input values of corresponding neural units are too small.

The training unit 140 generates another reference pattern 52 by adding one to the quantity value of record "S'1, R'1" in the initial reference pattern 51 (see FIG. 12). The quantity field of record "S'1, R'1" in the reference pattern 52 now has a value of 1.2 as indicated by a bold frame in FIG. 13. The training unit 140 then rearranges records in the input dataset 31 such that they will have a maximum similarity to the noted reference pattern 52, thus generating a transformed dataset 62. The training unit 140 makes a comparison of quantity values between the original transformed dataset 61 and the newly generated transformed dataset 62, thus calculating variations in their quantity fields. More specifically, the quantity value of each record in the transformed dataset 61 is compared with the quantity value of the corresponding record in the transformed dataset 62. The two records have the same combination of a source host identifier (term S) and a destination host identifier (term R). Take records "S'1, R'1," for example. The quantity value "1" in the original transformed dataset 61 is subtracted from the quantity value "3" in the new transformed dataset 62, thus obtaining a variation of "2" between their records "S'1, R'1." The training unit 140 calculates such quantity variations from each record pair, finally yielding a variation vector (2, −2, 2, −2).

The training unit 140 calculates an inner product of the error vector (1.3, −0.1, −1.0, 0.7) and variation vector (2, −2, 2, −2). This inner product, −0.6, suggests a modification to be made to a specific combination of source host (term S) and destination host (term R) (e.g., "S'1, R'1" in the present case). For example, the training unit 140 registers a modification value (MOD) of −0.6 as part of record "S'1, R'1" in the modification dataset 80.

The error vector suggests how much and in which direction the individual input values deviate from what they ought to be, such that the output value would have an increased error. If this error vector resembles a variation vector that is obtained by adding one to the quantity value of record "S'1, R'1," it means that the increase in the quantity value acts on the output value in the direction that expands the output error. That is, the output value will have more error if the quantity value of record "S'1, R'1" is increased, in the case where the inner product of error vector and variation vector is positive. On the other hand, the output value will have less error if the quantity value of record "S'1, R'1" is increased, in the case where the inner product of error vector and variation vector is negative.

Figure 14:
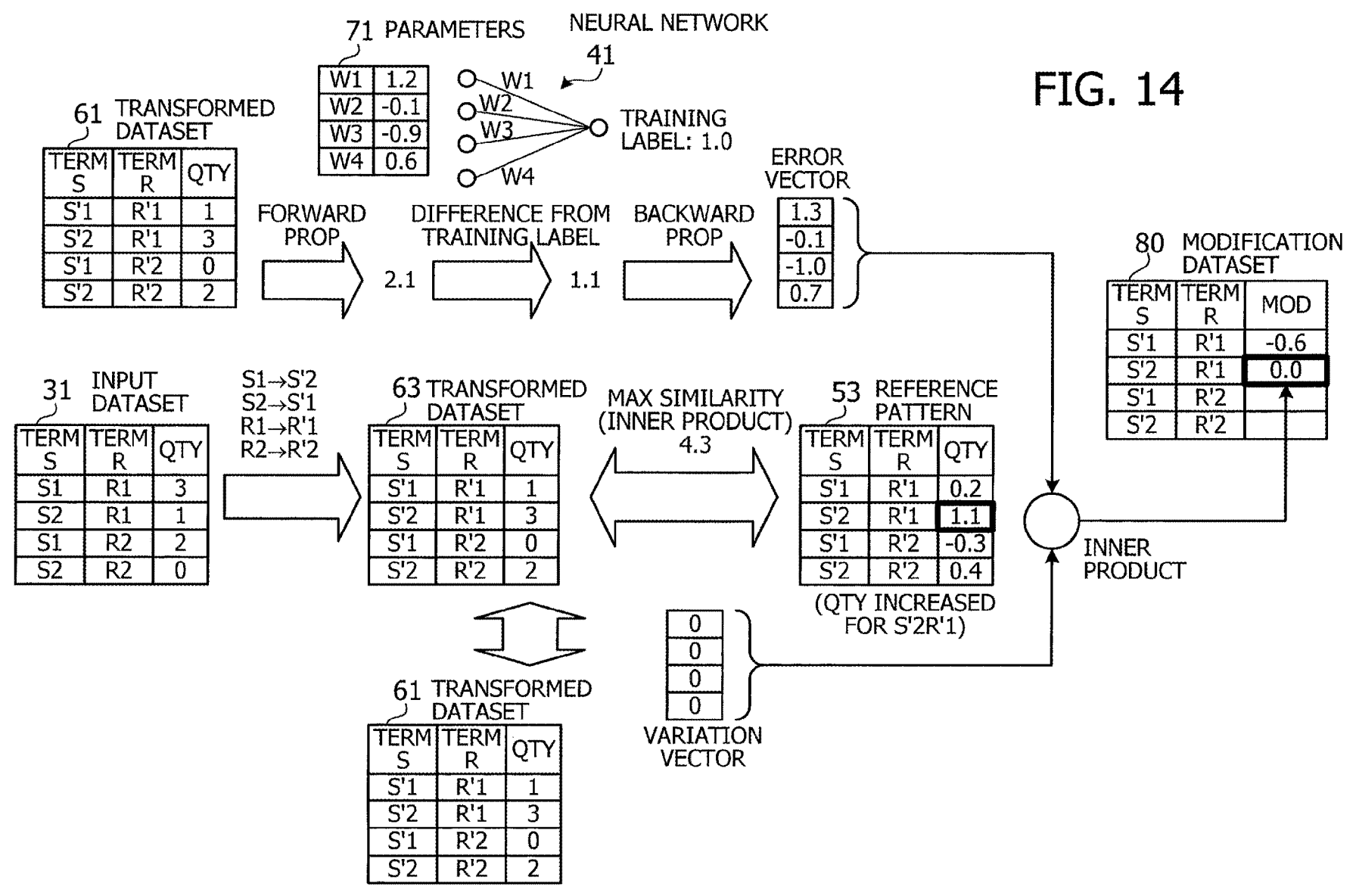

FIG. 14 is a third diagram illustrating a machine learning process by way of example. The training unit 140 generates yet another reference pattern 53 by adding one to the quantity value of record "S'2, R'1" in the initial reference pattern 51 (see FIG. 12). The quantity field of record "S'2, R'1" in the reference pattern 53 now has a value of 1.1 as indicated by a bold frame in FIG. 14. The training unit 140 then rearranges records in the input dataset 31 such that they will have a maximum similarity to this reference pattern 53, thus generating a transformed dataset 63. The training unit 140 makes a comparison of quantity values between each record having a source host identifier (term S) and destination host identifier (term R) in the original transformed dataset 61 and its corresponding record in the newly generated transformed dataset 63, thus calculating variations in their quantity fields. The training unit 140 generates a variation vector (0, 0, 0, 0) indicating no quantity variations in each record pair. The training unit 140 calculates an inner product of the error vector (1.3, −0.1, −1.0, 0.7) and variation vector (0, 0, 0, 0), thus obtaining a value of 0.0. The training unit 140 registers this inner product in the modification dataset 80 as a modification value for record "S'2, R'1."

Figure 15:
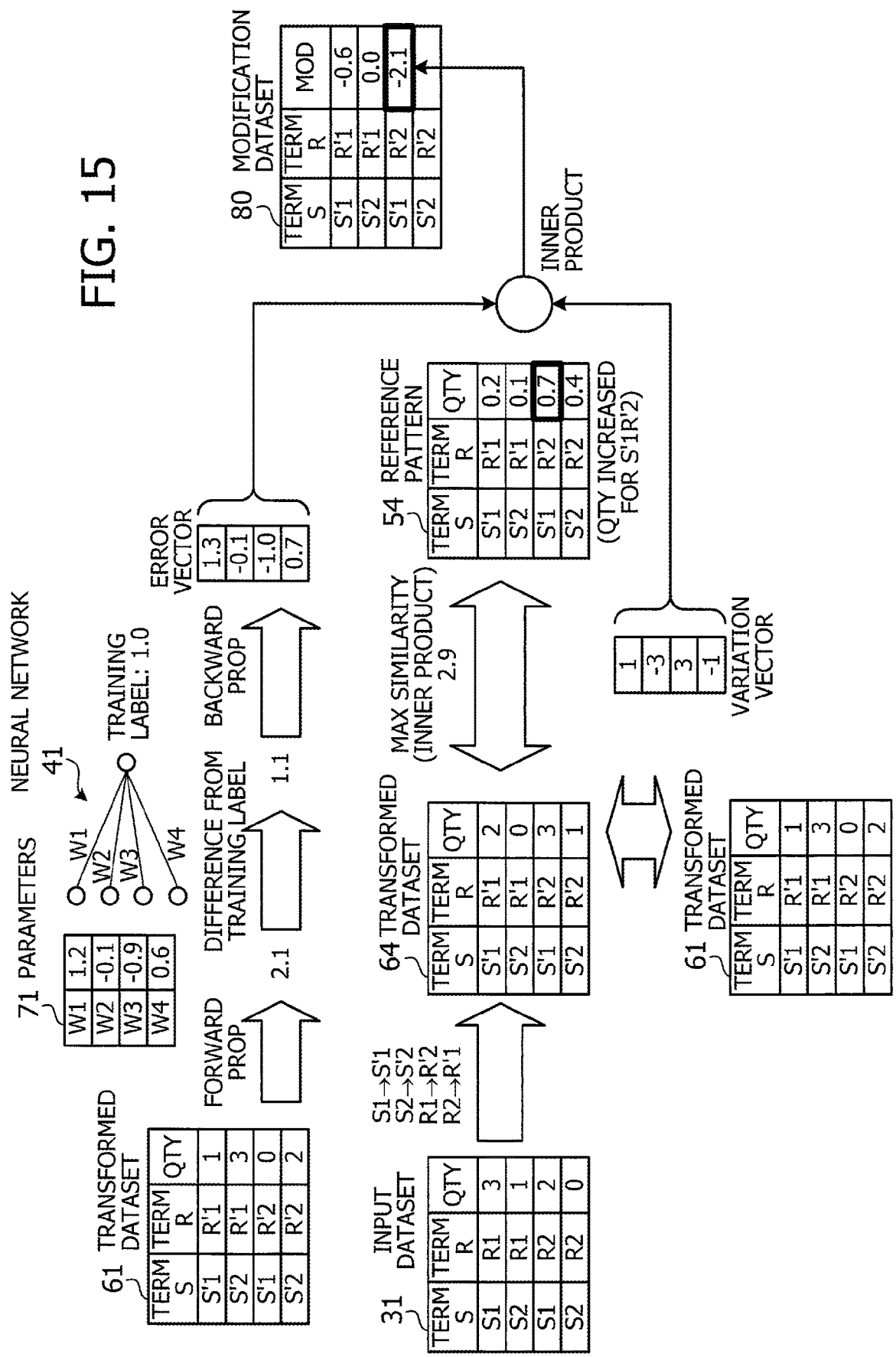
FIG. 15 is a fourth diagram illustrating a machine learning process by way of example.

FIG. 15 is a fourth diagram illustrating a machine learning process by way of example. The training unit 140 generates still another reference pattern 54 by adding one to the quantity value of record "S'1, R'2" in the initial reference pattern 51 (see FIG. 12). The quantity field of record "S'1, R'2" in the reference pattern 54 now has a value of 0.7 as indicated by a bold frame in FIG. 15. The training unit 140 then rearranges records in the input dataset 31 such that they will have a maximum similarity to this reference pattern 54, thus generating a transformed dataset 64. The training unit 140 makes a comparison of quantity values between each record having a specific source host identifier (term S) and destination host identifier (term R) in the original transformed dataset 61 and its corresponding record in the newly generated transformed dataset 64, thus calculating variations in their quantity fields. The training unit 140 generates a variation vector (1, −3, 3, −1) representing quantity variations calculated for each record pair. The training unit 140 calculates an inner product of the error vector (1.3, −0.1, −1.0, 0.7) and variation vector (1, −3, 3, −1), thus obtaining a value of −2.1. The training unit 140 registers this inner product in the modification dataset 80 as a modification value for record "S'1, R'2."

Figure 16:
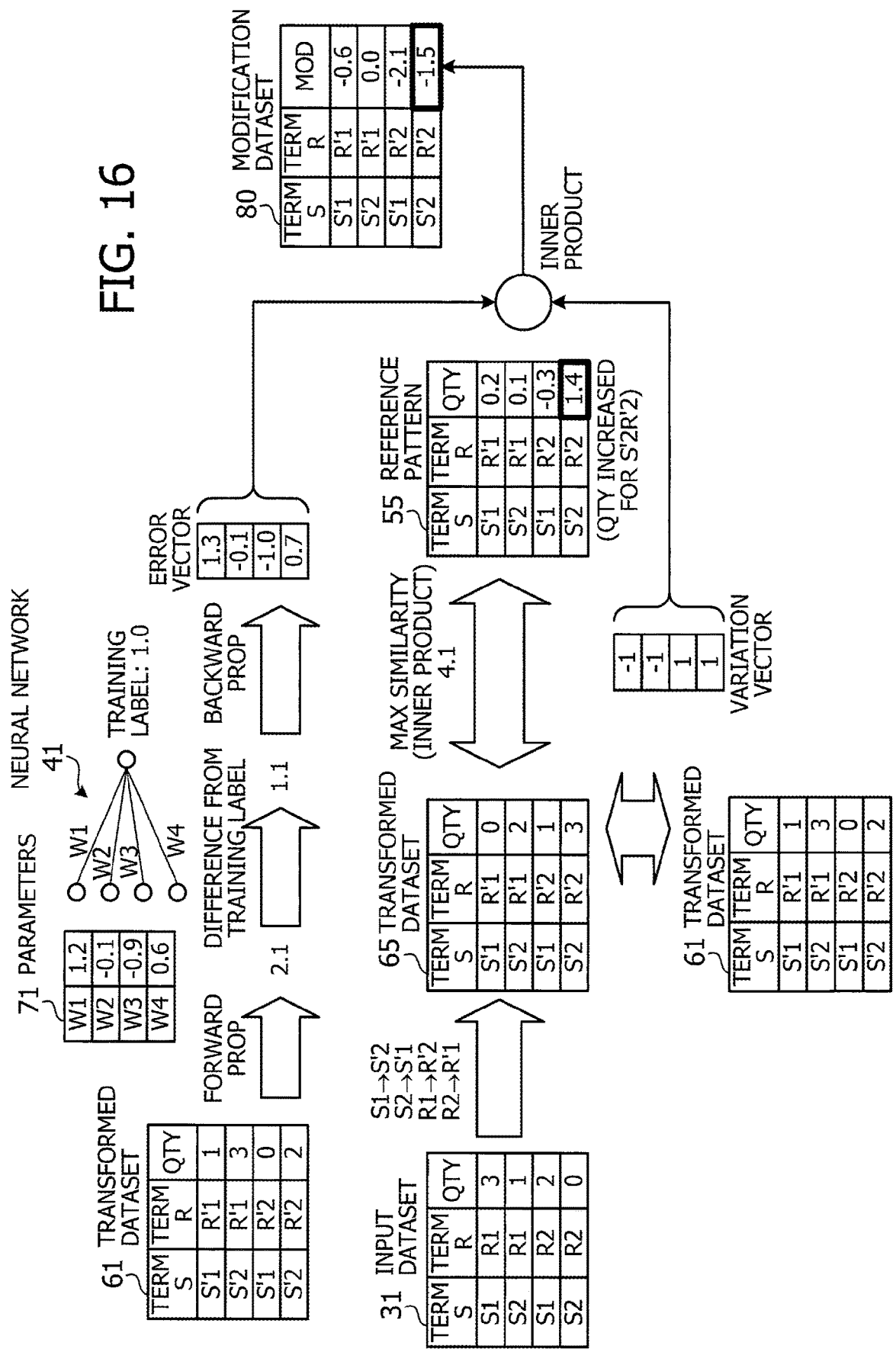
FIG. 16 is a fifth diagram illustrating a machine learning process by way of example.

FIG. 16 is a fifth diagram illustrating a machine learning process by way of example. The training unit 140 generates still another reference pattern 55 by adding one to the quantity value of record "S'2, R'2" in the initial reference pattern 51 (see FIG. 12). The quantity field of record "S'2, R'2" in the reference pattern 55 now has a value of 1.4 as indicated by a bold frame in FIG. 16. The training unit 140 then rearranges records in the input dataset 31 such that they will have a maximum similarity to this reference pattern 55, thus generating a transformed dataset 65. The training unit 140 makes a comparison of quantity values between each record having a specific source host identifier (term S) and destination host identifier (term R) in the original transformed dataset 61 and its corresponding record in the newly generated transformed dataset 65, thus calculating variations in their quantity fields. The training unit 140 generates a variation vector (−1, −1, 1, 1) representing quantity variations calculated for each record pair. The training unit 140 calculates an inner product of the error vector (1.3, −0.1, −1.0, 0.7) and variation vector (−1, −1, 1, 1), thus obtaining a value of −1.5. The training unit 140 registers this inner product in the modification dataset 80 as a modification value for record "S'2, R'2."

Figure 17:
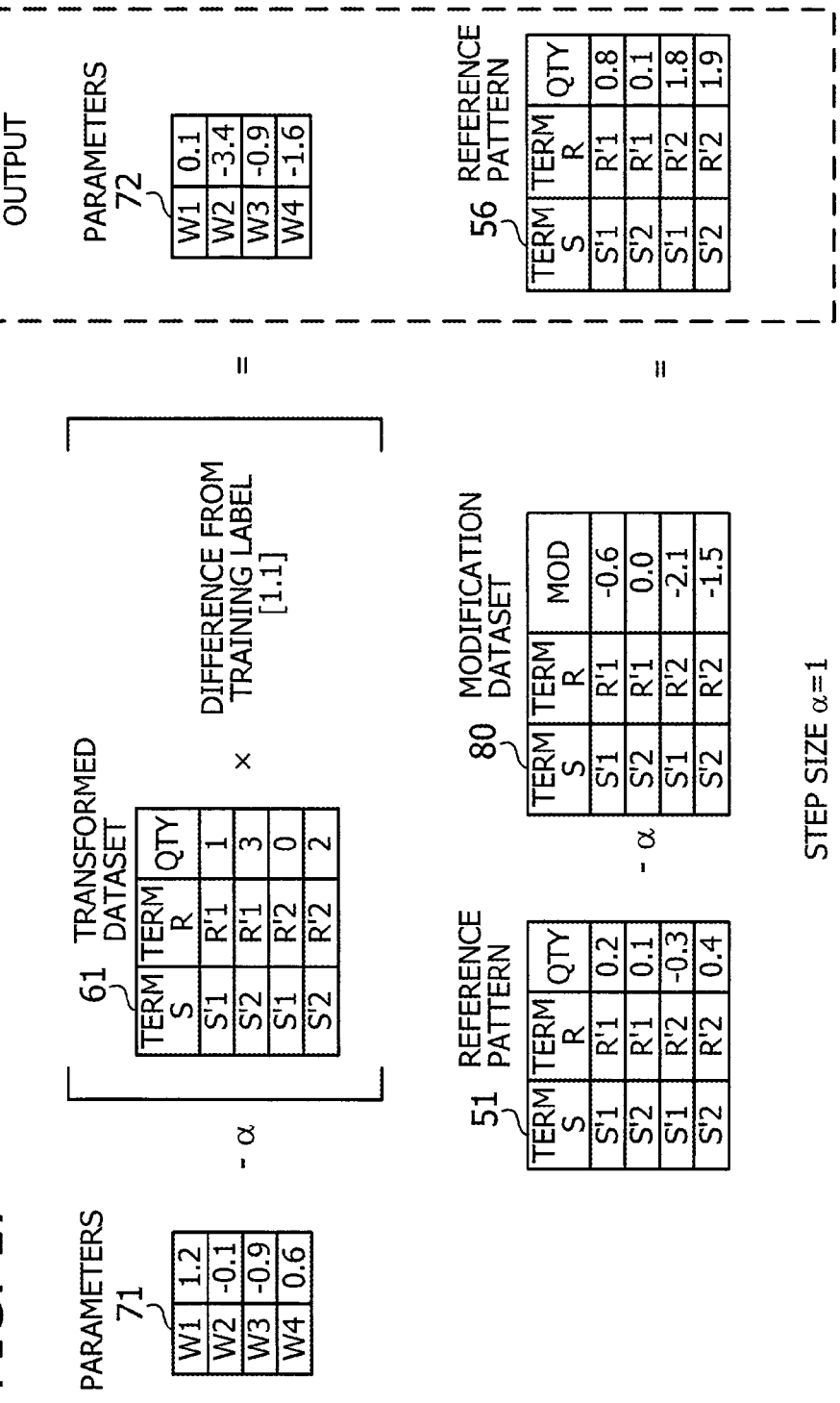
FIG. 17 is a sixth diagram illustrating a machine learning process by way of example.

FIG. 17 is a sixth diagram illustrating a machine learning process by way of example. The training unit 140 multiplies the quantity values of each record in the transformed dataset 61 by the difference, 1.1, between the forward propagation result and training label value of the neural network 41. The training unit 140 further multiplies the resulting product by a constant α. This constant α represents, for example, a step size of the neural network 41 and has a value of one in the example discussed in FIGS. 11 to 17. The training unit 140 then subtracts the result of the above calculation (i.e., the product of quantity values in the transformed dataset 61, difference 1.1 from training label, and constant α) from respective parameters 71.

For example, the training unit 140 multiples an input quantity value of 1 for the first neural unit in the input layer by a difference value of 1.1 and then by α=1, thus obtaining a product of 1.1. The training unit 140 then subtracts this product from the corresponding weight W1=1.2, thus obtaining a new weight value W1=0.1. The same calculation is performed with respect to other input-layer neural units, and their corresponding weight values are updated accordingly. Finally, a new set of parameters 72 is produced.

In addition to the above, the training unit 140 subtracts variation values in the modification dataset 80, multiplied by constant α, from the corresponding quantity values in the reference pattern 51, for each combination of a source host identifier (term S) and a destination host identifier (term R). The training unit 140 generates an updated reference pattern 56, whose quantity fields are populated with results of the above subtraction. For example, the quantity field of record "S'1, R'1" is updated to 0.8 (i.e., 0.2−1×(−0.6)).

When there are two or more input datasets, the training unit 140 calculates a plurality of transformed datasets 61 for individual input datasets and averages their quantity values. Based on those average quantities, the training unit 140 updates the weight values in parameters 71. The training unit 140 also calculates the modification dataset 80 for individual input datasets and averages their modification values. Based on those average modification values, the training unit 140 updates quantity values in the reference pattern 51.

As can be seen from the above, the training unit 140 updates reference patterns using error in the output of a neural network, and the analyzing unit 160 classifies communication logs using the last updated reference pattern. For example, the analyzing unit 160 transforms communication logs having no learning flag in such a way that they may bear the closest similarity to the reference pattern. The analyzing unit 160 then enters the transformed data into the neural network and calculates output values of the neural network. In this course of calculation, the analyzing unit 160 weights individual input values for neural units according to parameters determined above by the training unit 140. With reference to output values of the neural network, the analyzing unit 160 determines, for example, whether any suspicious communication event took place during the collection period of the communication log of interest. That is, communication logs are classified into two groups, one including normal (non-suspicious) records of communication activities and the other group including suspicious records of communication activities. The proposed method thus makes it possible to determine an appropriate order of input data records, contributing to a higher accuracy of classification.

To seek an optimal order of input data records, various possible ordering patterns may be investigated. The proposed method, however, cuts down the number of such ordering patterns and thus reduces the amount of computational resources for the optimization job. Suppose, for example, that each input record describes a combination of three items (e.g., persons or objects), respectively including A, B, and C types, and that each different combination of the three items is associated with one of N numerical values. Here, the numbers A, B, C, and N are integers greater than zero. What is to be analyzed in this case for proper reference matching amounts to as many as $(A!B!C!)^N$ possible ordering patterns. As the number N of numerical values increases, the number of such ordering patterns grows exponentially, and thus it would be more and more difficult to finish the computation of machine learning within a realistic time frame. The second embodiment assumes that the symbols A', B', and C' represent the numbers of types respectively belong to three items in the reference pattern, and that the symbol E represents the number of updates made in the neural network, where A', B', C', and E are all integers greater than zero. The amount of computation in this case is proportional to A'B'C'(A+B+C)NE. This means that the computation is possible with a realistic amount of workload.

(c) Other Embodiments

The foregoing second embodiment is directed to an application of machine learning for classifying communication logs, where the order of input values affects the accuracy of classification. But that is not the only case of order-sensitive classification. For example, chemical compounds may be classified by their structural properties that are activated regardless of locations of the structure. Accurate classification of compounds would be achieved if it is possible to properly order the input data records with reference to a certain reference pattern.

Figure 18:
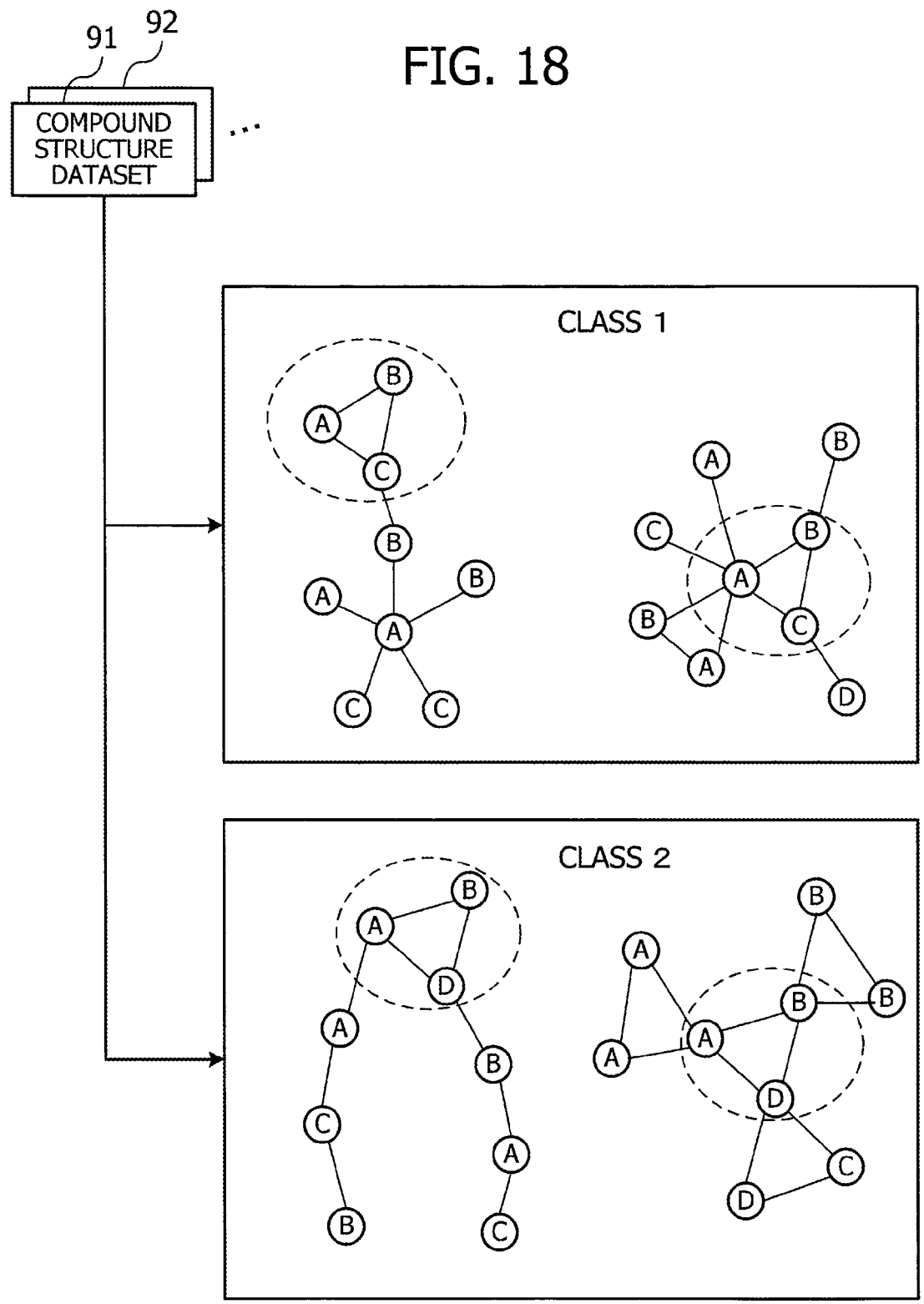
FIG. 18 illustrates an example of classification of compounds.

FIG. 18 illustrates an example of classification of compounds. This example assumes that a plurality of compound structure datasets 91, 92, . . . are to be sorted in accordance with their functional features. Each compound structure dataset 91, 92, is supposed to include multiple records that indicate relationships between two constituent substances in a compound.

Classes 1 and 2 are seen in FIG. 18 as an example of classification results. The broken-line circles indicate relationships of substances that make a particularly considerable contribution to the classification, and such relationships may appear regardless of the entire structure of variable-to-variable relationships. A neural network may be unable to classify compound structure datasets 91, 92, . . . properly if such relationships are ordered inappropriately. This problem is solved by determining an appropriate order of relationships in the compound structure datasets 91, 92, . . . using a reference pattern optimized for accuracy. It is therefore possible to classify compounds in a proper way even in the case where the location of active structures is not restricted.

Several embodiments and their variations have been described above. In one aspect, the proposed techniques make it possible to determine an appropriate order of input values.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a learning program that causes a computer to perform a procedure comprising:

obtaining an input dataset including a set of numerical values and a training label indicating a correct classification result corresponding to the input dataset;

determining an input order in which the numerical values in the input dataset are to be entered to a neural network for data classification, based on a reference pattern that includes an array of reference values to provide a criterion for ordering the numerical values;

calculating an output value of the neural network whose input-layer neural units respectively receive the numerical values arranged in the input order;

calculating an input error at the input-layer neural units of the neural network, based on a difference between the calculated output value and the correct classification result indicated by the training label; and updating the reference values in the reference pattern, based on the input error at the input-layer neural units.

2. The non-transitory computer-readable storage medium according to claim 1, wherein the determining of an input order includes:

forming a first vector whose elements are the numerical values arranged in a specific order;

forming a second vector whose elements are the reference values in the reference pattern; and seeking an input order of the numerical values that maximizes an inner product of the first vector and the second vector, by varying the specific order.

3. The non-transitory computer-readable storage medium according to claim 1, wherein the updating of the reference values includes:

selecting one of the reference values in the reference pattern;

determining a tentative input order of the numerical values, based on a temporary reference pattern generated by temporarily varying the selected reference value by a specified amount;

calculating difference values between the numerical values arranged in the input order determined by using the reference pattern and corresponding numerical values arranged in the tentative input order determined by using the temporary reference pattern;

determining whether to increase or decrease the selected reference value in the reference pattern, based on the input error and the difference values; and modifying the selected reference value in the reference pattern according to a result of the determining of whether to increase or decrease.

4. The non-transitory computer-readable storage medium according to claim 3, wherein the determining of whether to increase or decrease the selected reference value includes:

forming a third vector representing the input error at the input-layer neural units;

forming a fourth vector from the difference values arranged according to the tentative input order of the numerical values; and determining whether to increase or decrease the selected reference value, based on an inner product of the third vector and the fourth vector.

5. A machine learning method comprising:

obtaining an input dataset including a set of numerical values and a training label indicating a correct classification result corresponding to the input dataset;

determining, by a processor, an input order in which the numerical values in the input dataset are to be entered to a neural network for data classification, based on a reference pattern that includes an array of reference values to provide a criterion for ordering the numerical values;

calculating, by the processor, an output value of the neural network whose input-layer neural units respectively receive the numerical values arranged in the input order;

calculating, by the processor, an input error at the input-layer neural units of the neural network, based on a difference between the calculated output value and the correct classification result indicated by the training label; and updating, by the processor, the reference values in the reference pattern, based on the input error at the input-layer neural units.

6. A machine learning apparatus comprising:

a memory that stores therein a reference pattern including an array of reference values to provide a criterion for ordering numerical values to be entered to a neural network for data classification; and a processor configured to perform a procedure including:

obtaining an input dataset including a set of numerical values and a training label indicating a correct classification result corresponding to the input dataset;

determining an input order in which the numerical values in the input dataset are to be entered to the neural network, based on the reference pattern in the memory;

calculating an output value of the neural network whose input-layer neural units respectively receive the numerical values arranged in the input order;

calculating an input error at the input-layer neural units of the neural network, based on a difference between the calculated output value and the correct classification result indicated by the training label; and updating the reference values in the reference pattern, based on the input error at the input-layer neural units.

\* \* \* \* \*